United States Patent
Klumpp, Jr.

[15] 3,701,505
[45] Oct. 31, 1972

[54] CABLE CONNECTOR

[72] Inventor: Ferdinand Klumpp, Jr., Mountainside, N.J.

[73] Assignee: Heyman Manufacturing Company, Kenilworth, N.J.

[22] Filed: Nov. 23, 1970

[21] Appl. No.: 91,923

[52] U.S. Cl. ............... 248/56, 174/65 R, 174/153 G, 285/162, 339/103 C
[51] Int. Cl. ................................................. F16l 5/00
[58] Field of Search ........ 248/56; 285/128, 243, 207, 285/159, 162; 174/153 G, 65; 339/103 C

[56] References Cited

UNITED STATES PATENTS

| | | |
|---|---|---|
| 3,493,205 | 2/1970 | Bromberg .................... 248/56 |
| 3,559,730 | 3/1971 | Denjean ............. 174/153 G X |
| 2,490,253 | 12/1949 | Buchanan ................. 174/65 R |
| 3,181,900 | 5/1965 | Hayward .................. 285/243 |
| 3,424,856 | 1/1969 | Coldren ................. 174/153 G |
| 3,427,894 | 2/1969 | Tschanz ................. 285/162 X |

FOREIGN PATENTS OR APPLICATIONS

| | | | |
|---|---|---|---|
| 699,892 | 8/1942 | Germany ................. 248/74 R |

*Primary Examiner*—Chancellor E. Harris
*Attorney*—Auslander & Thomas

[57] ABSTRACT

A plastic connector including an aperture gripping feature and closeable gripping yokes safely functions to replace prior expensive metal parts requiring laborious installation.

8 Claims, 12 Drawing Figures

PATENTED OCT 31 1972

INVENTOR.
FERDINAND KLUMPP, Jr.
BY Auslander + Thomas
ATTORNEYS

PATENTED OCT 31 1972 3,701,505

INVENTOR.
FERDINAND KLUMPP, JR.
BY Auslander + Thomas
ATTORNEYS

CABLE CONNECTOR

The present invention relates to an improved cable connector.

Heretofore, cable connectors were generally of metal and were fit into electric boxes or other fittings by complicated, labor consuming means usually including a nut over a threaded outer portion of the connector to hold it in the box. Then a second clamping means usually grasped the cable, whether armored cable or insulated cable.

Aside from the cost of the many parts of such prior connectors of the past, there was the big labor cost of screwing the parts together once they had been inserted for use.

According to the present invention, a single plastic piece is provided that has grasp means that register with an opening by insertion and simple grasping means to provide the necessary strain relief that armored or insulated cable requires in order to function safely.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figure 1:
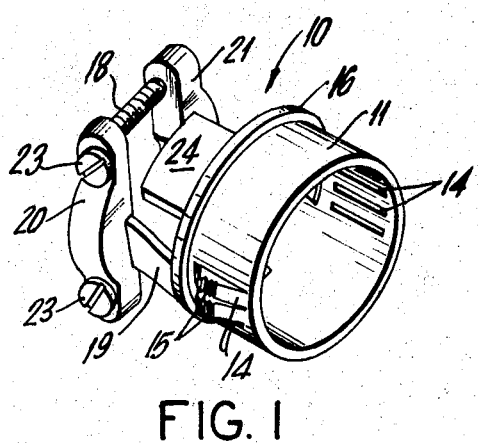
FIG. 1 is an isometric view of the cable connector of the present invention.
Figure 2:
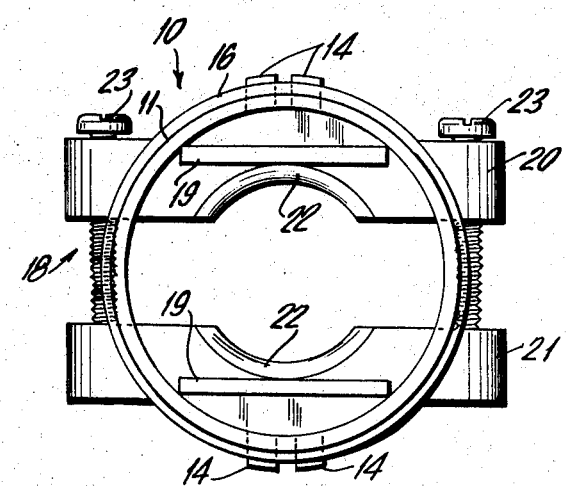
FIG. 2 is a front elevation of FIG. 1.
Figure 2A:
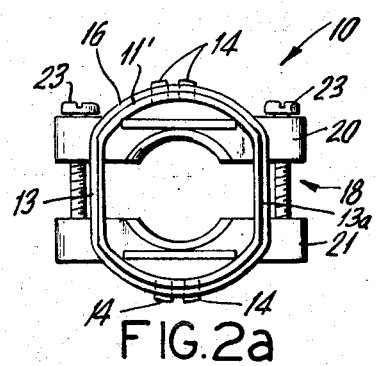
FIG. 2a is a front elevation of a modification of the connector of FIG. 2.
Figure 9:
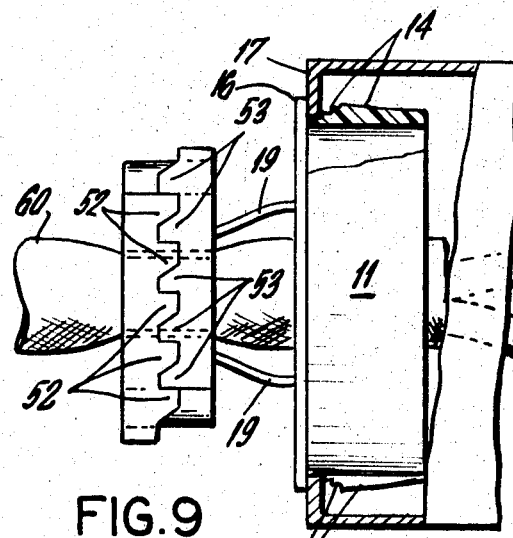
FIG. 9 is a side elevation of a cable connector of the present invention locked in an aperture clamping cable.

The connector 10 as shown in FIGS. 1 and 2 is preferably made of a flexible high heat resistant dielectric plastic and self-extinguishable in case of fire. The connector 10 has a bushing portion 11 for insertion of the connector 10 into an aperture 12 as shown in FIG. 9. The bushing 11' as shown in FIG. 2a has a pair of flat sides 13 to fit in an appropriate aperture (not shown) and not rotatable.

The bushings 11, 11' as shown in FIGS. 1, 2, 2a and 9 include grasping means, in this instance, fingers 14 with stepped shoulders 15.

The bushing 11 has a flange portion 16 on its outer periphery, thus when inserted into an aperture 12, the fingers 14 grasp the peripheral panel 17 wall about the aperture 12 and the flange 16 holds the bushing 11 and connector 10 firmly in place.

The flange 16 and fingers 14 are illustrative of one form of means used to hold bushings in apertures. A selection of holding means known in the bushing art may be used to hold the bushing portion 11 in an aperture 12.

In FIGS. 1, 2 and 2a, the gripping portion 18 of the connector 10 comprises a pair of integral straps 19 extending from the flange 16 or face of the bushing 11, each strap 19 having an integral yoke 20, 21. The yokes 20, 21 may have corrugations 22 to assist in better grasping a cable or wire. The yokes 20, 21 are joined by screws 23 held by thread (not shown) in yoke 21 so that by turning the screws 23, the yokes 20, 21 are tightenable over cable, armored or not, wire, or some form of electric line, which may be securely grasped by the connector 10 with its bushing 11, 11' secured in an aperture 12.

In FIG. 1 protective flanges 24 extend from the bushing 11 and flange 16 (only one being shown in the figure). The protective flanges 24 cover the areas that surround the cable or wire.

Figure 3:
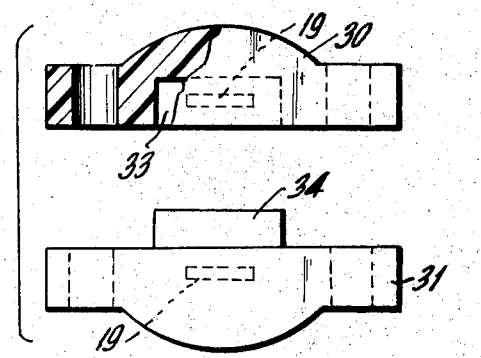
FIG. 3 is a detail of one form of clamping arms including a strain relief.

In FIG. 3, variant yokes 30, 31 are provided with a strain relief cavity 33 and a strain relief gripper 34.

Thus, when the yokes 30, 31 are closed on a cable or wire, strain on a wire or cable will be at the crimp between the cavity 33 and gripper 34.

Figure 4:
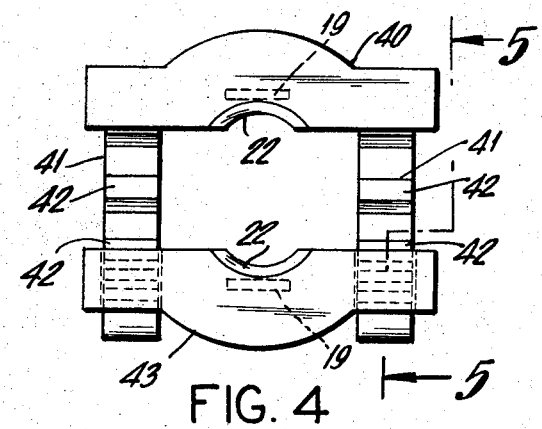
FIG. 4 is a detail of a self-locking embodiment of clamping arms.
Figure 5:
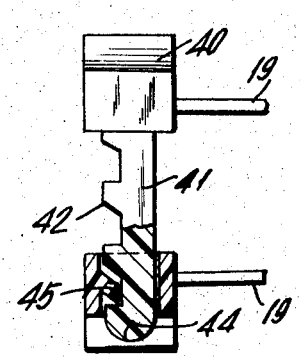
FIG. 5 is a section of FIG. 4 at lines 5—5.
Figure 6:
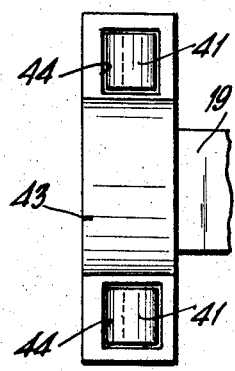
FIG. 6 is a bottom plan view of FIG. 4.

The yoke 40 as shown in FIGS. 4, 5 and 6 has two detents 41 with teeth 42. The yoke 43 has a pair of openings 44. Each opening as can be seen in section in FIG. 5, has a tooth 45 to grasp the detent 41, teeth 42 and hold the yokes 40, 43 in position closed over a cable or wire. In FIG. 6, the yoke 43 may be seen with the detent 41 held as shown in FIG. 5.

Figure 7:
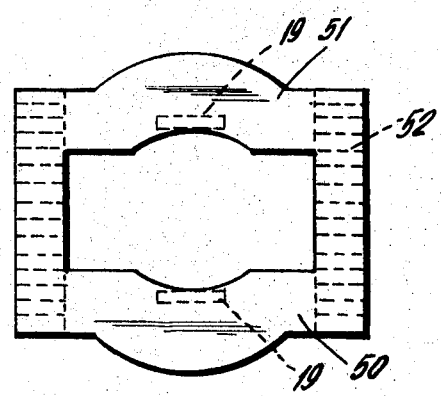
FIG. 7 is a detail of another self-locking embodiment of clamping arms.
Figure 8:
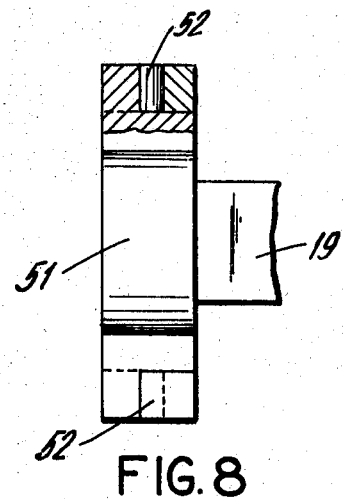
FIG. 8 is a partially broken away plan view of one of the clamping arms of FIG. 7.

The yokes 50, 51, as shown in FIGS. 7 through 9 have interfitting detent teeth 52, 53. In FIG. 7, the yokes 50, 51 are shown in open position. FIG. 8 shows a broken-away top plan view showing the teeth 52, 53 engaged.

As shown in FIG. 9, a bushing portion 11 is emplaced in an aperture 12. Once the bushing 11 of the connector 10 is in place, a cable 60 as shown with wires 61 may be inserted through the bushing and the cable 60 grasped by the squeezing together of the yokes 50, 51. The teeth 52, 53 firmly hold the yokes 50, 51 and cable 60.

Figure 10:
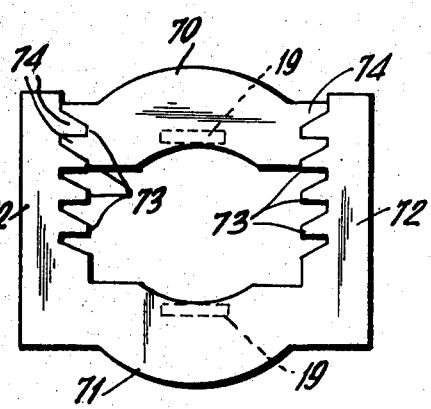
FIG. 10 is a front elevation of another self-locking embodiment of clamping arms.
Figure 11:
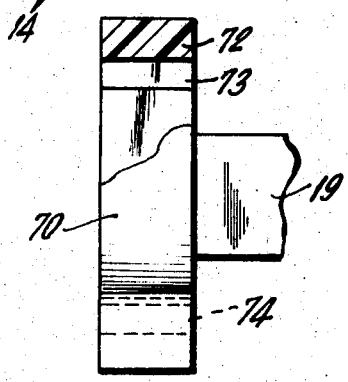
FIG. 11 is a partially cut away plan view of the clamping arms of FIG. 10.

In FIGS. 10 and 11 another configuration of yokes 70, 71 of the present invention is shown. One yoke 71 has a pair of arms 72 with integral facing teeth 73, while the other yoke 70 has interfitting teeth 74. The yokes 70, 71 may be closed over a cable as shown with the yokes 50, 51 in FIG. 9. In FIG. 11, relationship of the arm 72 and the teeth 73 is shown broken away while a tooth 74 is shown dotted as it is held by the teeth 73.

The connector 10 of the present invention is particularly useful for holding cable, armored or not, or wire in an electric junction box. The high heat resistant dielectric plastic construction allows inexpensive manufacture of the integral bushings 11, 11' and various yoke constructions. The grasping means on the bushings 11, 11' minimize the time-consuming labor of the past threading nuts on shanks so that the connector would be held firmly in an aperture.

The plastic is preferably one that is self extinguishing under flaming conditions, one that might deform under heat but not drop burning particles, or at least particles which might drop and ignite fires.

The yokes held by the straps 19 provide strength to the grasping means employed with only a small amount of labor to grasp cable, armored or not, or wire.

The terms and expressions which are employed are used as terms of description; it is recognized, though, that various modifications are possible.

Having thus described certain forms of the invention in some detail, what is claimed is:

1. A plastic electric line connector for insertion into an aperture comprising a connector made of plastic adapted to extinguish itself under flaming conditions, a bushing portion, said bushing portion including an outer flange, gripping means on said bushing, said gripping means adapted to grasp a peripheral aperture wall between said flange and said gripping means, and integral strap means extending from said bushing, said strap means including integral yoke means, said yoke means adapted to grasp an electric line.

2. The invention of claim 1 wherein said grasping means further include screw means.

3. The invention of claim 1 wherein said grasping means is corrugated.

4. The invention of claim 1 wherein said grasping means is adapted to act as a strain relief.

5. The invention of claim 4 wherein said strain relief comprises a cavity and a gripper adapted to interact with said cavity.

6. The invention of claim 1 wherein said grasping means include interlocking detents.

7. The invention of claim 6 wherein said interlocking detents include teeth.

8. The invention of claim 1 wherein said bushing includes flat sides.

* * * * *